United States Patent [19]
Bosco

[11] Patent Number: 5,912,962
[45] Date of Patent: Jun. 15, 1999

[54] METHOD OF PORTING FOR USE WITH LOCAL NUMBER PORTABILITY

[75] Inventor: Joseph Anthony Bosco, Chicago, Ill.

[73] Assignee: Northern Telecom Limited, Montreal, Canada

[21] Appl. No.: 08/796,591

[22] Filed: Feb. 6, 1997

Related U.S. Application Data

[60] Provisional application No. 60/011,211, Feb. 6, 1996.

[51] Int. Cl.$^6$ ........................................... H04M 3/42
[52] U.S. Cl. .................. 379/219; 379/93.02; 379/93.03; 379/127; 379/207
[58] Field of Search ................................ 379/207, 219, 379/220, 221, 229, 230, 201, 188, 196, 197, 198, 127, 211, 212, 93.02, 93.03, 93.01

[56] References Cited

U.S. PATENT DOCUMENTS

| | | | |
|---|---|---|---|
| 5,003,595 | 3/1991 | Collins et al. | 379/93.02 |
| 5,181,238 | 1/1993 | Medamana et al. | 379/93.03 |
| 5,321,242 | 6/1994 | Heath, Jr. | 379/93.03 |
| 5,416,833 | 5/1995 | Harper et al. | 379/201 |
| 5,451,757 | 9/1995 | Heath, Jr. | 379/93.03 |
| 5,463,681 | 10/1995 | Vaios et al. | 379/93.02 |
| 5,475,746 | 12/1995 | Miller et al. | 379/93.02 |
| 5,491,742 | 2/1996 | Harper et al. | 379/201 |
| 5,510,777 | 4/1996 | Pilc et al. | 379/93.03 |
| 5,550,912 | 8/1996 | Akinpelu et al. | 379/201 |
| 5,661,792 | 8/1997 | Akinpelu et al. | 379/221 |
| 5,689,555 | 11/1997 | Sonnenberg | 379/220 |
| 5,696,816 | 12/1997 | Sonnenberg | 379/220 |
| 5,740,239 | 4/1998 | Bhagat et al. | 379/207 |
| 5,748,724 | 5/1998 | Sonnenberg | 379/212 |
| 5,751,802 | 5/1998 | Carr et al. | 379/201 |
| 5,764,745 | 6/1998 | Chan et al. | 379/207 |

Primary Examiner—Scott Wolinsky
Attorney, Agent, or Firm—Foley & Lardner

[57] ABSTRACT

As was seen in the long distance market when it became de-regulated, there were many instances of unauthorized transfers of a customer from one long distance provider to another. Customers having not requested a transfer would not be made aware of the completed transfer until at the earliest the first billing received from the new long distance provider. Once LNP network solutions are implemented and the various service providers can provide their customers with the various types of LNP, service providers and their subscribers will require automated methods of porting as disclosed which reduce the number of unauthorized porting requests including the unauthorized transfers of subscribers from one service provider to another.

17 Claims, 1 Drawing Sheet

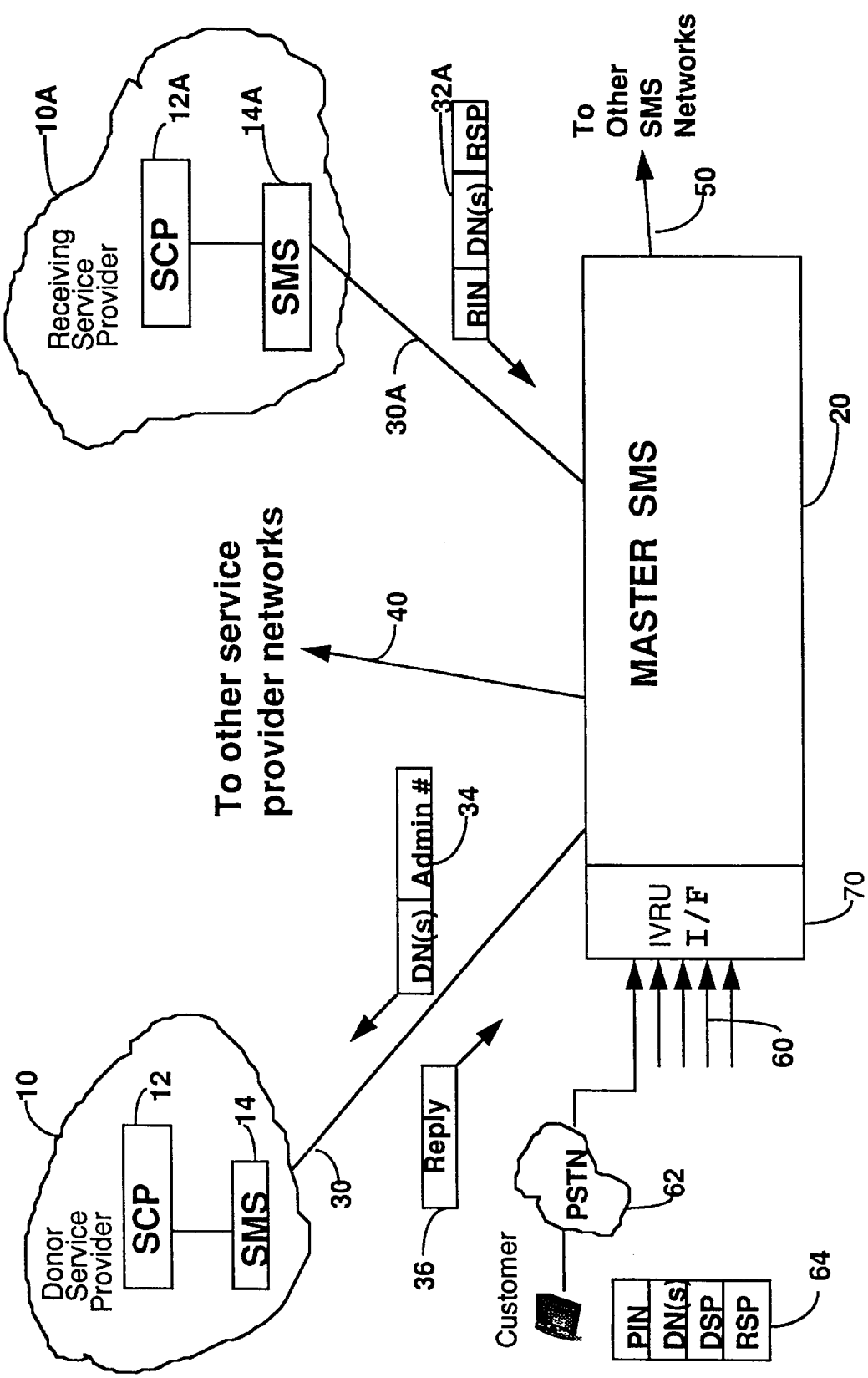

METHOD OF PORTING FOR USE WITH LOCAL NUMBER PORTABILITY

This application claims the benefit of U.S. Provisional application Ser. No. 60/011,211, filed Feb. 6, 1996.

FIELD OF THE INVENTION

This invention relates to local number portability and more particularly to a method of porting for use with local number portability.

BACKGROUND OF THE INVENTION

Local Number Portability (LNP) today, provides a network solution which enables subscribers or end users in a predetermined geographical area, (City, Metro Area, LATA, STATE) to retain their telephone number even though they may have physically moved within that geographical area and/or wish to change from one service provider to another. Location LNP thus enables a subscriber to move from one permanent physical location to another within the geographical area. Location LNP for example enables a subscriber or end user to move from a downtown region to the suburbs without changing their telephone number. Service Provider LNP on the other hand, enables subscribers or end users within the geographical area to determine which service provider provides them with dial tone and to change their service provider at any time without being required to give up their current telephone number. Other forms of LNP such as Service LNP would allow an end user to keep their same telephone number while changing their service from one type to another, from for example plain old telephone service (POTS) to Integrated Switched Digital Network (ISDN).

It is estimated that as LNP becomes available to customers in a large metropolitan areas for example (2,000,000 telephone access lines) that 20% or 400,000 access lines may wish to port (change) their Service Provider in a 24 month period. This would equate to 16,666 Service Provider ports per month or 750 per business day. These numbers are expected to double if an additional 20% of the subscribers in the same 24 month period wish to also take advantage of Location LNP; a reasonable prediction.

As was seen in the long distance market when it became de-regulated there were many instances of unauthorized transfers of a customer from one long distance provider to another. Customers having not requested a transfer would not be made aware of the completed transfer until at the earliest the first billing received from the new long distance provider.

Once LNP network solutions are implemented and the various service providers can provide their customers with the various types of LNP, service providers will desire methods of porting which are efficient and substantially automated as well as methods which reduce the number of unauthorized transfers of subscribers from one service provider to another or other unauthorized porting requests.

BRIEF DESCRIPTION OF THE DRAWINGS

FIG. 1 illustrates a master Service Maintenance System and associated Service Provider network connections according to an embodiment of the invention.

SUMMARY OF INVENTION

The invention seeks to provide a method of porting which reduces the likelihood of service providers acting upon unauthorized porting requests.

In one aspect of the invention there is provided a method of porting for use with local number portability comprising the steps of providing a subscriber with a reference identification number; receiving a porting request to port a directory number; collecting porting data necessary to effect the porting request, the porting data to comprise the reference identification number and a directory number to be ported; verifying that the collected reference identification number is associated with the subscriber of the directory number to be ported to thereby authorize initiating the porting request; and effect porting of the directory number in response to successful verification of the collected reference identification number being associated with the subscriber of the directory number to be ported.

To effect porting of the directory number in response to successful verification of the reference identification number being associated with the subscriber of the directory number to be ported provides a secure method of porting and will minimize the chances of unauthorized porting requests being acted upon by service providers (the practice of slamming).

When the porting request is to port a directory number from a first service provider to a second service provider and the step of effecting porting of the directory number is from the first service provider to the second service provider, the method advantageously further comprises the step of collecting from the first service provider, custom calling information associated with directory numbers being ported. This would benefit the customer as they would not have to for example recreate speed calling lists with the new SP or to re-apply for optional services; this would all be done automatically for the customer by the second SP upon receiving the custom calling information previously associated with the directory numbers being ported.

Preferably the custom calling information is collected by a third party and passed on to the second service provider.

In a further aspect of the invention there is provided a method of porting for use with local number portability comprising the steps of receiving over a telephone line a porting request to port a directory number; collecting porting data necessary to effect the porting request, the porting data to comprise a directory number to be ported; identifying the directory number associated with the telephone line; and verifying that the identified directory number is the directory number requested to be ported; effect porting of the directory number to be ported in response to successful verification of the identified directory number being the directory number to be ported.

To effect porting of the directory number in response to successful verification that the identified directory number of the telephone line used to make the porting request, is a directory number to be ported provides the subscriber with a high level of security as porting requests would have to be made from ones cottage or residence to port a respective DN or from ones office to port an office DN. Since these premises generally are not public places, an unauthorized porting request is less likely to be initiated by friends, family members or colleagues.

Advantageously the method of porting includes the step of providing a subscriber with a personal identification number and the step of effect porting of the directory number to be ported is in response to successful verification of both the identified directory number being a directory number to be ported and the successful verification of the collected personal identification number being associated with the subscriber. Requiring two levels of verification to authorize a porting request provides a very secure method of porting for both the customer and the service provider.

DETAILED DESCRIPTION

The Intelligent Network (IN) architecture has been evolved through the efforts of various groups, in particular Bellcore, European Telecommunications Standards Institute (ETSI), International Telecommunications Union (ITU-T), and American National standards Institute (ANSI). These groups have issued respective documentation defining the general Intelligent Network architecture along with the various entities found within the Network. Advanced Intelligent Network (AIN) is another industry term for the Intelligent Network (IN).

Generally known telecommunication intelligent network entities in existence today along with other terms used in the detailed description are briefly described in general terms below:

SSP—(Service Switching Point) That node in an Intelligent Network normally associated with an end office and equipped with AIN software. A SSP is generally a central office enhanced with CCS7 messaging links and AIN software which permit it to communicate with application data bases such as Service Control Points (SCP's). Pre-defined Call Processing Triggers in the SSP AIN software result in the SSP initiating queries to network SCP's for information regarding completing call processing of a particular call.

STP—(Signal Transfer Point) A packet switch in the Common Channel Signaling No. 7 (CCS7) Network that enables cost effective routing of CCS7 signals between other network elements (CCS7 nodes).

SCP—(Service Control Point) A centralized network element in the Intelligent Network that individual switches call upon to obtain information and commands necessary for completing an AIN call. The SCP is the intelligence center in a CCS7 AIN network which processes queries for information and returns a response to the originator of the query.

SMS—(Service Management System) The operations support system for Advanced Intelligent Networking. The SMS provides the interface to a service providers operations systems. It provides the mechanism for downloading new features to the SCP and monitors the AIN network.

IN—(Intelligent Network) A generic term for the Advanced Intelligent Network.

IP—(Intelligent Peripheral) An Advanced Intelligent Networking Network Element that generally only controls a special set of features or provides a specialized set of functions to support features. Intelligent Peripherals are similar to SCP's in that they provide the intelligence to drive AIN features but are more specialized.

Two separately owned service provider (SP) networks 10, 10A are shown in FIG. 1, a donor service provider (DSP) 10 and a receiving service provider (RSP) 10A, each of which comprises a respective Service Control Point (SCP) 12, 12A connected over a proprietary communication link to a respective Service Maintenance System (SMS) 14, 14A. Service provider networks 10, 10A in the United States for example may be owned by Competitive Access Providers (CAP), Regional Bell Operating Companies (RBOC) or any Independent Operating Company (IOC). Each service providers SMS 14, 14A is connected to a Master SMS 20 via respective data links 30, 30A. The Master SMS 20 is also shown having connections 40 to other service provider networks (not shown) as well as connections 50 to other SMS networks (not shown). The SMS's in general are data bases which have knowledge of all numbers which have been ported, the current geographical location (which end office switch) associated with such DN's and the current SP for the DN. The SMS's would also typically store history files for all ported numbers. The Master SMS 20 in this embodiment of the invention provides additional functionality as it acts and functions as a porting administrator. The Master SMS 20 may be owned by a consortium of service providers and operated by a third party independent of the service providers. The master SMS 20 of FIG. 1 also includes multiple dial up ports 60 which in turn are connected to a customer interface 70. The customer interface 70 comprises an interactive voice response unit (IVRU) which includes a Dual Tone Multiple Frequency (DTMF) Receiver (not shown) for providing automated two-way interface capabilities with the customer. Typically the customer interface would be an adjunct to the existing Master SMS 20.

In operation a subscriber who wishes to change service providers for example contacts the service provider who they wish to port to (the receiving service provider), provides them with the DN they wish to port and the receiving service provider 10A of FIG. 1 would then provide the subscriber with a unique reference identification number (RIN). The receiving SP 10A, shortly after being contacted by a subscriber, sends a notice of the request to port in the form of message (data packet) 32A over it's data link 30A to the Master SMS 20. The message 32A would contain such information as the directory number to be ported, the assigned reference identification number and may even identify itself as the RSP 10A in the event dedicated links 30A are not used. The message 32A may also include such data as time and date stamp information as well as when the subscriber wishes to be ported (e.g. actual date and time). The Master SMS 20, stores the message 32A in memory upon receiving it from the receiving service provider 10A.

The customer upon receiving their reference identification number, can at any time initiate the porting process by authorizing their intention to port, with the Master SMS 20 by dialing a predetermined number such as for example, 1-800-PORT NOW. The dialing of the predetermined number connects the customer directly to the customer interface 70 associated with the Master SMS 20 through dial up ports 60 and the public switched telephone network (PSTN) 62. Once connected to the customer interface 70, the customer inputs data 64 (e.g. key pad or voice) requested by the IVRU associated with the Master SMS 20. The data 64 input by the customer in responding to prompts from the IVRU would typically only need to include the reference identification number. Upon receiving both the customer entered data 64 and the message 32A sent by the Receiving SP 10A, the Master SMS 20 attempts to locate the corresponding stored message 32A by looking for a match between the unique identification number entered in data 64 and the stored message 32A. The Master SMS 20 has access to data in stored message 32A and hence knows the DN to be ported and who the RSP 10A is to be. The Master SMS 20 also having knowledge of all DN's and who their current corresponding SP's are, can identify the Donner SP 10 by looking up in a table who the current serving SP (now the Donner SP) is for the DN to be ported in message 32A. Optionally the customer may for confirmation purposes include in data 64, the Directory Number (DN) or numbers to be ported, the identity of the Donor SP 10, and the identity of Receiving SP 10A.

The customer may register their intention to port, with the Master SMS 20 either before or after message 32A arrives at the Master SMS 20 from the Receiving SP 10A. The Master SMS 20 stores the customer entered data 64 in memory and associates it with data contained in the message 32A sent by (or to be sent by) the receiving SP 10A. The association may be preferably by the unique reference identification number or if data 64 includes the DN to be ported then the association may be by Directory Number. If either data 64 or message 32A is not received within a predetermined time the process is deemed to have been abandoned and appropriate data records are cleared from memory. The subscriber of the DN to be ported may also be notified.

If the Master SMS 20 detects and locates the corresponding stored message 32A by looking for a match between the unique identification number entered in data 64 and the stored message 32A, it then sends a porting notification message 34 to the Donor SP 10. The notification message 34 would include data which would identify to the Donor SP 10, which directory number(s) it would be giving up to an other service provider, preferably without actually identifying the RSP 10A. The notification message 34 would also include other information such as for example an administration number or Porting request number for tracking or reference purposes. Once the Donor SP 10 has received the notification message 34, it responds by sending a confirmation or acknowledgement message 36 back to the Master SMS 20. The Donor SP 10 may for a fee, optionally include in the acknowledgement message 36, information directly relating to current customer custom profiles which are associated with the DN (s) which are in the process of being ported. For example, a receiving SP 10A may wish to provide transparent porting and hence may be willing to pay for a list of current speed calling numbers, those services such as call waiting, call forward etc., which are associated with the DN(s). This optional data may be included as part of the acknowledgement message 36 or as part of a separate message. This would benefit the customer as they would not have to re-create a speed calling list with the new SP or re-apply for optional services (call waiting etc.); this would all be done automatically for the customer by the Receiving SP 10A as this information would have been passed on by the Master SMS 20 or be sent directly to the Receiving SP 10A by the Donner SP 10.

Once the master SMS 20 has received the acknowledgement message 36 from the Donor service provider 10 the administration portion of the porting process is substantially completed. A customer or more correctly their DN(s) are not actually ported until the access facility directly associated with the DN(s) is transferred from the Donor PS's equipment to the equipment of the Receiving SP and respective SCP's 12,12A have been updated with new routing information. Currently, the access facility transfer in the majority of cases, is a manual process by which technicians physically disconnect and reconnect jumpers from respective distribution frames but in the near future virtually all transfers will be electronically switched. Currently therefore, to complete the porting process a technician at some predetermined time, first must ensure appropriate transfer of a subscribers local loop or access facility, from the Donor SP's equipment to the equipment of the Receiving SP. The predetermined time may be a porting time requested and entered by the customer (data 64) or may be a porting time determined by the Receiving SP 10A and sent to the Master SMS 20 as part of message 32A, or an other predetermined time determined by any of the Service Providers 10, 10A or administrators of the Master SMS 20. Once the transfer has taken place the technician notifies the Master SMS 20 of the completed transfer for example by calling a predetermined number and entering for instance a work order number, the technician's identification number and the directory numbers which have had their access facility transferred. The Master SMS 20 then triggers the porting to actually take place by sending messages to all service providers SMS's 14, 14A which in turn update respective SCP's 12,12A. The Master SMS 20 may in some instances update a respective service provider's SCP 12,12A directly. The directory number(s) within a few minutes of the SCP's 12,12A being updated, would then be serviced by the Receiving SP 10A and the porting process effectively completed.

Alternatively, a personal identification number (PIN) is assigned to a subscriber the first time they subscribe to telephone service provided by any Service Provider anywhere in a predetermined geographical area and effectively carried for as long as the customer/subscriber remains in the predetermined geographical area.

Today in a mobile originated call a mobile telephone set identifies itself to a receiving switch when it goes off hook by sending to the receiving switch a two part mobile identification number (MIN) and its serial number. The two part MIN comprises a 10 digit identification code of which the last seven digits are associated with the subscribers telephone number and may in fact be the subscribers number. This identification number is then checked for validity by the receiving switch. For porting of cellular subscribers from one service provider to another, a subscribers cellular identification number (just described) may be used as the security number for the method of porting described herein to prevent the unauthorized transfer of a cellular telephone customer from one service provider to another.

In a further embodiment of the invention a further security check to prevent or block the unauthorized transfer of a telephone customer from one service provider to another or any other unauthorized porting request is achieved by requiring the customer to call the porting administrators (the Master SMS 20) either using the line to be ported or if a group of lines is to be ported, to call on one of the lines of the group to be ported. The interface 70 if equipped with Automatic Number Identification (ANI) would then identify the calling line and include this information along with the specific data regarding a porting request input to the Master SMS 20 by the customer. To then validate a porting request the Master SMS 20 would then compare data contained in message 32A and customer data 64 as already described but also provide an additional check that the line the customer is calling the Master SMS 20 on is actually one of the lines identified to be ported in message 32A.

Alternatively, in yet a further embodiment of the invention, preventing unauthorized transfers is achieved by identifying and verifying that the line the customer is calling the porting administrators on is actually one of the lines identified to be ported in message 32A or in the customer porting data 64. In this embodiment the receiving SP 10A would not necessarily be required to send message 32A to the Master SMS 20. The customer may initiate a porting request by directly interfacing with the Master SMS 20. The Master SMS 20 would then collect the customer porting data 64, and validate the porting request by verifying that the line the customer is calling the Master SMS 20 on is actually one of the lines identified to be ported in porting data 64. The Master SMS 20 would then communicate with both Service providers 10,10A over links 30,30A, to effect porting of the directory numbers. Although personal identification numbers would not be required to validate a porting request, this method would be less secure than requiring validation of a personal identification number.

In further embodiments of the invention, providing a PIN for straight location LNP with no SP change is used to prevent unauthorized porting requests as well as to time the actual implementation of the porting. A customer upon requesting a geographical or physical location port uses a provided PIN in a similar manner as has already been described. The verification of the PIN as described above is then used by the service provider to effectively authorize the porting request. A further advantage is realized in location LNP as upon verification of the PIN the SP may immediately implement the porting of the DN since for a straight location port there is no facility transfer to coordinate as has been described. A customer therefore can coordinate the precise time of day they wish to have their number ported from one location to another. Alternatively, as in previous embodiments, preventing unauthorized location porting requests can be achieved by identifying the calling line and further security checks can be implemented by combining line identification with PIN verification.

What is claimed is:

1. A method of porting for use with local number portability comprising the steps of:

providing a subscriber with a reference identification number in response to receiving from the subscriber a directory number that the subscriber desires to port;

receiving from the subscriber a porting request to port the directory number;

collecting porting data necessary to effect the porting request, the porting data comprising the reference identification number and the directory number to be ported;

verifying that the collected reference identification number is associated with the subscriber of the directory number to be ported to thereby authorize initiating the porting request; and effecting porting of the directory number in response to successful verification of the collected reference identification number being associated with the subscriber of the directory number to be ported.

2. A method of porting as claimed in claim 1 wherein the porting request is to port the directory number from a first service provider to a second service provider and the step of effecting porting of the directory number is from the first service provider to the second service provider.

3. A method of porting as claimed in claim 2 wherein the second service provider provides the subscriber with the reference identification number.

4. A method of porting as claimed in claim 2 including the step of collecting, from the first service provider, custom calling information associated with the directory number to be ported.

5. A method of porting as claimed in claim 4 wherein the custom calling information is collected by a third party and a further step of sending the collected custom calling information on to the second service provider is provided for by the third party.

6. A method of porting as claimed in claim 2, wherein the porting request is received over a telephone line.

7. A method of porting as claimed in claim 2, wherein a third party collects the porting data.

8. A method of porting as claimed in claim 1 wherein the porting request is received over a telephone line.

9. A method of porting as claimed in claim 1 wherein a third party collects the porting data.

10. A method of porting for use with local number portability comprising the steps of:

receiving over a telephone line a porting request to port a directory number;

collecting porting data necessary to effect the porting request, the porting data comprising the directory number to be ported;

identifying the directory number associated with the telephone line using Automatic Number Identification (ANI);

verifying that the identified directory number is the directory number requested to be ported; and effecting porting of the directory number to be ported in response to successful verification of the identified directory number being the directory number to be ported.

11. A method of porting as claimed in claim 10 further comprising the steps of:

providing a subscriber with a personal identification number;

the step of collecting further includes collecting the personal identification number;

providing an additional verification that the collected personal identification number is associated with the subscriber of the directory number to be ported; and effecting porting of the directory number to be ported in response to successful verification of the identified directory number being the directory number to be ported and successful verification of the collected personal identification number being associated with the subscriber of the directory number to be ported.

12. A method of porting as claimed in claim 11, wherein the porting request is to port the directory number from a first service provider to a second service provider and the steps of effecting porting of the directory number are from the first service provider to the second service provider.

13. A method of porting as claimed in claim 10 wherein the porting request is to port the directory number from a first service provider to a second service provider and the step of effecting porting of the directory number is from the first service provider to the second service provider.

14. A method of porting as claimed in claim 13 wherein the second service provider provides a subscriber with a personal identification number.

15. A method of porting as claimed in claim 14 wherein a third party collects from the subscriber the porting data.

16. A method of porting as claimed in claim 13 further comprising the step of collecting, from the first service provider, custom calling information associated with the directory number to be ported.

17. A method of porting as claimed in claim 16 wherein the custom calling information is collected by a third party and a further step of sending the collected custom calling information on to the second service provider is provided for by the third party.

* * * * *